United States Patent [19]

Osada et al.

[11] 4,395,778

[45] Jul. 26, 1983

[54] UNDESIRED SIGNAL CANCELLER

[75] Inventors: Yasuo Osada, Tokyo; Takeo Nakagawa, Atsugi; Kimitake Utsunomiya, Sagamihara, all of Japan

[73] Assignee: Sony Corporation, Tokyo, Japan

[21] Appl. No.: 204,551

[22] Filed: Nov. 6, 1980

[30] Foreign Application Priority Data

Nov. 9, 1979 [JP] Japan ............................. 54-145679
Nov. 9, 1979 [JP] Japan ............................. 54-145680

[51] Int. Cl.$^3$ .............................................. H04B 1/18
[52] U.S. Cl. .................................. 455/276; 455/279; 455/284; 455/286; 343/854
[58] Field of Search ................. 358/905; 455/276, 284, 455/286, 278, 279, 272, 273; 343/852, 853, 893, 854; 333/156, 159, 164

[56] References Cited

U.S. PATENT DOCUMENTS

| | | | |
|---|---|---|---|
| 1,697,945 | 1/1929 | Beverage | 455/276 |
| 2,130,485 | 9/1938 | Feldman et al. | 455/276 X |
| 2,226,836 | 12/1940 | Sinninger | 455/278 |
| 2,271,909 | 2/1942 | Beverage | 455/276 X |
| 2,617,927 | 11/1952 | Cohen | 455/279 |
| 2,650,297 | 8/1953 | Damron | 455/279 |
| 4,100,496 | 7/1978 | Akiyoshi et al. | 455/276 |
| 4,160,952 | 7/1979 | Seastrand | 455/276 |

*Primary Examiner*—Robert L. Richardson
*Attorney, Agent, or Firm*—Hill, Van Santen, Steadman, Chiara & Simpson

[57] ABSTRACT

Apparatus for cancelling undesired signals for a radient energy receiver having first and second antennas which are spaced a distance apart and including a phase compensation circuit connected to one of the antennas and a variable phase shift circuit connected to the second antenna with the variable phase shift circuit comprising a plurality of series connected inductors wherein adjacent inductors are magnetically coupled together and a plurality of voltage variable capacitors with adjacent ones of the voltage variable capacitors connected between ground and the junction points between adjacent ones of the series connected inductors and adding means connected to the outputs of the phase compensation circuit and the variable phase shift circuit and means for supplying a variable DC voltage to the variable voltage capacitors to control their capacitance.

10 Claims, 23 Drawing Figures

UNDESIRED SIGNAL CANCELLER

BACKGROUND OF THE INVENTION

1. Field of the Invention

This invention relates generally to an undesired signal canceller, and is directed more particularly to an undesired signal canceller for use in a ghost canceller and so on of a television receiver.

2. Description of the Prior Art

Figure 1:
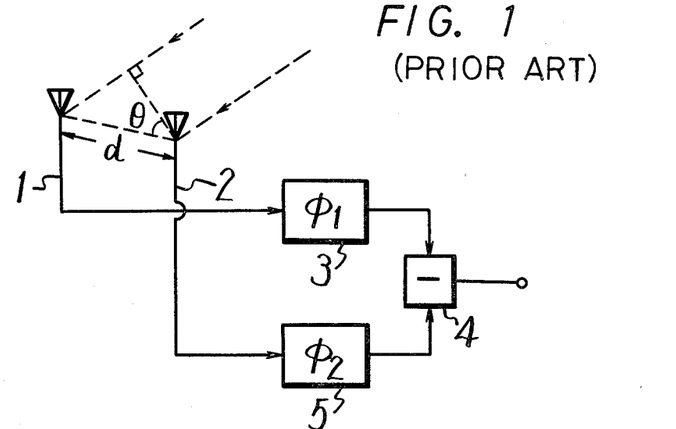
FIG. 1 is a block diagram showing a ghost canceller used for explaining the present invention.

In the art, an undesired signal canceller shown in FIG. 1 is already proposed. In the example of FIG. 1, two antennas 1 and 2 are arranged apart with a distance d. The signal received by the antenna 1 is applied through a phase compensation circuit 3 with the phase shift of $\phi_1$ to a subtraction type circuit 4, while the signal received by the antenna 2 is supplied to the subtraction type circuit 4 through a variable phase shifter 5 with the phase shift of $\phi_2$.

In this case, it is known that the total directivity coefficient $D(\theta)$ of the above antenna device or arrangement is expressed as follows:

$$D(\theta) = f(\theta)\sin\left(\frac{kd}{2}\sin\theta - \frac{\phi_2 - \phi_1}{2}\right) \quad (1)$$

where k is a propagation constant and $f(\theta)$ is the directivity of each antenna.

Accordingly, in order to make a null point or null direction (which is a point when the receiving sensitivity is 0) on the direction angle $\theta$, it is sufficient if the following equation (2) is established.

$$\frac{kd}{2}\sin\theta - \frac{\phi_2 - \phi_1}{2} = n\pi \quad (2)$$

In the above equation (2), if $n=0$ and $\phi_2 - \phi_1$ is varied within the range of $\pm kd$, the null point can be presented in a desired direction. Further, if $\phi_2 - \phi_1$ is proportional to a frequency $F (\phi_2 - \phi_1 = KF)$, $k(=(2\pi F)/C)$, C is the velocity of light) is also proportional to the frequency F. Therefore, a null point $\theta_N$ is expressed as follows:

$$\theta_N = \sin^{-1}\frac{KC}{2\pi d} \quad (3)$$

Thus, the null point $\theta_N$ can be set in a constant direction irrespective of received signal frequencies.

In this case, a coaxial cable is generally employed as the phase shifter 5 whose phase shift amount is proportional to the frequency F.

In this case, however, since the phase shift amount of the coaxial cable corresponds to its length, the phase adjustment thereof is very difficult. For this reason, a plurality of coaxial cables are prepared and they are switchably used. This adjustment, however, is rather complicated and it is also troublesome to change the null point after it has once been. Further, it is impossible to adjust the null point while a user stays near a television receiver.

OBJECTS AND SUMMARY OF THE INVENTION

Accordingly, an object of this invention is to provide a novel undesired signal canceller free from the defects inherent to the prior art.

Another object of the invention is to provide an undesired signal canceller by which a null point can be easily adjusted.

A further object of the invention is to provide an undesired signal canceller in which once a null point has been adjusted is not varied for received signal frequencies.

According to an aspect of the present invention, an undesired signal canceller is provided which comprises:

(A) a pair of antennas arranged in parallel for receiving an input signal within a predetermined frequency range, said input signal including desired and undesired signals;

(B) a variable phase shifter connected to one of said pair of antennas, said variable phase shifter including a low pass filter network consisting of a plurality of L-C stages each of which includes a coil and a capacitor; and (C) an adding circuit connected between said variable phase shifter and the other of said pair of antennas, the degree of coupling between two neighboring coils of said low pass filter network is sequentially designed such that said undesired signal is effectively eliminated in the output of said adding circuit regardless of the frequency of said input signal within said predetermined frequency range.

The other objects, features and advantages of the present invention will become apparent from the following description taken in conjunction with the accompanying drawings through which the like references designate the same elements and parts.

DESCRIPTION OF THE PREFERRED EMBODIMENT

This invention will be hereinafter described with reference to the attached drawings.

In an example of the invention, a low pass filter type variable phase shifter is used as the phase shifter 5 in the prior art example of FIG. 1.

Figure 2:
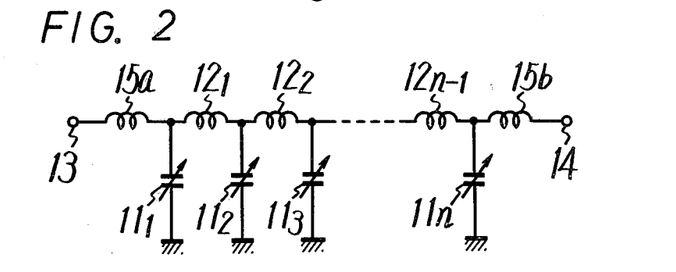
FIG. 2 is a connection diagram showing an example of the variable phase shifter of a low pass filter type used in the invention.

An example of the low pass filter type variable phase shifter used in the invention will be now described with reference to FIG. 2. As shown in FIG. 2, the variable phase shifter of this example is formed of a plurality of variable capacitance elements $11_1$ to $11_n$ each of which is grounded at its one end and a plurality of coils $12_1$ to $12_{n-1}$ which are respectively connected between other ends of adjacent variable capacitance elements. Further, coils 15a and 15b, each of which has an inductance which is one half of that of each of the coils $11_1$ to $11_n$, are connected between an input terminal 13 and the first variable capacitance element $11_1$ at the input side and between the last variable capacitance element $11_n$ at the output side and an output terminal 14, respectively.

The amount of phase shift of this variable phase shifter is expressed as follows:

$$\phi = 2\pi F \sqrt{n^2 L_0 C_0} \tag{4}$$

where n is the number of L-C stages, $C_0$ is the capacitance value of each of the variable capacitance elements $11_1$ to $11_n$ and $L_0$ is the inductance value of each of the coils $12_1$ to $12_{n-1}$.

Accordingly, if in the above variable phase shifter, for example, voltage controlled variable capacitance diodes are used as the variable capacitance elements $11_1$ to $11_n$ and $C_0$ thereof is varied, a certain desired amount of phase shift can be obtained.

In the invention, a phase compensation circuit, which is formed to have a construction similar to that of the above variable phase shifter 5, is used as the phase compensation circuit 3 of the prior art. In this case, the capacitance value of the respective capacitance elements $11_1$ to $11_n$ shown in FIG. 2 is fixed at a desired value to form the capacitance elements $11_1$ to $11_n$ as fixed capacitor.

Figure 3:
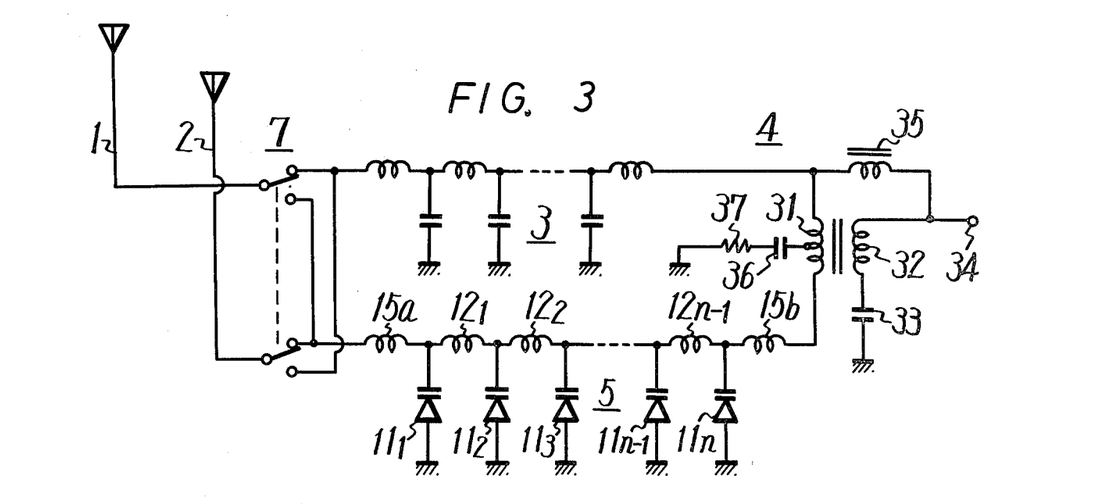
FIG. 3 is a circuit diagram showing an example of the fundamental circuit of the ghost canceller according to the invention.

Turning to FIG. 3, an example of the antenna device or arrangement used in the invention, in which the above variable phase shifter and phase compensation circuit are used, will be described.

In the example of FIG. 3, the signals from the antennas 1 and 2 are derived through a switching circuit 7. For example, the signal from the antenna 2 through the switching circuit 7 is supplied to a subtraction type circuit 4 through the variable phase shifter 5, while the signal from the antenna 1 through the switching circuit 7 is supplied to the circuit 4 through the phase compensation circuit 3. The transmission line from the phase shifter 5 and that from the phase compensation circuit 3 are connected together through a primary winding 31 of a transformer in the adding circuit 4. A secondary winding 32 of the transformer has one end grounded through a capacitor 33 and the other end is connected to a terminal 34. The windings 31 and 32 are connected through a choke coil 35, and the middle point of the primary winding 31 is grounded through a capacitor 36 and a resistor 37.

Thus, in the antenna device of FIG. 3, the signals from the variable phase shifter 5 and phase compensation circuit 3 are combined and delivered to the terminal 34 and then to the antenna input terminal of a television receiver (not shown). When at the side of the television receiver a control DC voltage is superimposed on the transmission line connected to the terminal 34, this DC voltage is applied through the choke coil 35 and the primary winding 31 to the variable phase shifter 5 and the capacitive value of its variable capacitance diodes $11_1$ to $11_n$ are controlled.

In this case, the impedance value $Z_0$ of the variable phase shifter 5 is given by the following formula (5);

$$Z_0 = \sqrt{\frac{L_0}{C_0}} \tag{5}$$

And, if the variable range of the respective capacitive value $C_0$ of the variable capacitance diodes $11_1$ to $11_n$ is selected in the range from 3 to 12pF, the design value of $C_0$ is selected as 6pF and the impedance value $Z_0$ is selected as 75Ω, the inductance value of each of the coils $12_1$ to $12_{n-1}$ becomes 33.8 nH.

Further, when the number of L-C stages in the variable phase shifter 5 is selected as 10, its amount of phase shift $\phi 2$ becomes as follows:

$$\phi 2 = 10 \times 2\pi f \sqrt{3.38 \times 10^{-9} \times C_0} \tag{6}$$

The amount of phase shift $\phi 1$ of the phase compensation circuit 3 is given by the following formula (7) when the capacitive value of each of the capacitors is selected as 7pF, the inductance value of each of the coils is selected as 36 nH and the number of L-C stages is selected to be 4, $$\phi 1 = 4 \times 2\pi f \sqrt{36 \times 10^{-9} \times 7 \times 10^{-12}} \tag{7}$$

Accordingly, the null point $\theta_N$ of the antenna device shown in FIG. 3 is given as follows:

$$\frac{2\pi f}{C_0} d \sin \theta_N + \phi 1 - \phi 2 = 0 \tag{8}$$

When d=135 cm, the expressions (6) and (7) are substituted into the expression (8) and the variable range of $C_0$ is selected from 3 to 12pF, the null point $\theta_N$ is varied as in the following table in which 1 to 12 channels show the Japanese television channels.

TABLE

| $C_0$ | Received Channel | $\theta_N$ |
|---|---|---|
| 3pF | 1 | 13.034 |
| 3pF | 2 | 13.029 |
| 3pF | 3 | 13.025 |
| 3pF | 4 | 13.916 |
| 3pF | 5 | 13.981 |
| 3pF | 6 | 14.025 |
| 3pF | 7 | 14.047 |
| 3pF | 8 | 14.051 |
| 3pF | 9 | 14.047 |

TABLE-continued

| $C_0$ | Received Channel | $\theta_N$ |
|---|---|---|
| 3pF | 10 | 14.035 |
| 3pF | 11 | 14.019 |
| 3pF | 12 | 14.000 |
| 6pF | 1 | 32.130 |
| 6pF | 2 | 32.156 |
| 6pF | 3 | 32.184 |
| 6pF | 4 | 32.626 |
| 6pF | 5 | 32.676 |
| 6pF | 6 | 32.728 |
| 6pF | 7 | 32.782 |
| 6pF | 8 | 32.820 |
| 6pF | 9 | 32.878 |
| 6pF | 10 | 32.939 |
| 6pF | 11 | 33.003 |
| 6pF | 12 | 33.070 |
| 9pF | 1 | 49.726 |
| 9pF | 2 | 49.946 |
| 9pF | 3 | 50.115 |
| 9pF | 4 | 50.798 |
| 9pF | 5 | 51.050 |
| 9pF | 6 | 51.311 |
| 9pF | 7 | 51.603 |
| 9pF | 8 | 51.746 |
| 9pF | 9 | 51.920 |
| 9pF | 10 | 52.016 |
| 9pF | 11 | 52.054 |
| 9pF | 12 | 52.071 |
| 12pF | 1 | 76.985 |
| 12pF | 2 | 77.007 |
| 12pF | 3 | 77.001 |
| 12pF | 4 | 83.998 |
| 12pF | 5 | 85.000 |
| 12pF | 6 | 84.999 |
| 12pF | 7 | 83.999 |
| 12pF | 8 | 83.001 |
| 12pF | 9 | 82.998 |
| 12pF | 10 | 82.998 |
| 12pF | 11 | 84.001 |
| 12pF | 12 | 84.001 |

According to the simple analysis of the antenna device shown in FIG. 3, as will be apparent from the above table, the null point $\theta_N$ varies in accordance with the received signal frequencies.

In view of the above point, according to the invention, the coupling inductance or mutual inductance M between arbitrary adjacent coils of the phase compensation circuit 3 and the variable phase shifter 5 in the antenna device of FIG. 3 is selected to satisfy the following formula.

$$(M/L_0 \simeq -0.2)$$

Thus, the non-linearity of the phase shifting amount can be remarkably improved.

Figure 4:
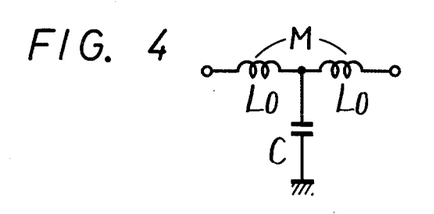
FIG. 4 is a circuit diagram used for explaining the operation of the fundamental unit circuit of the phase shifter used in the example of FIG. 3.

If a simple fundamental L-C phase shifting circuit shown in FIG. 4 is considered, the four-terminal parameters of this circuit become as follows:

$$\left.\begin{array}{l} A = 1 + zy \\ B = 2z + zy^2 \\ C = y \\ D = A \end{array}\right\} \quad (9)$$

where $z$ is $j\omega (L_0-M)$ and $y$ is $j\omega C/(1-\omega^2 CM)$.

Further, the image impedance $Z_0$ of this symmetrical four-terminal network becomes as follows:

$$Z_0 = \sqrt{\frac{B}{C}} = \sqrt{\frac{2(L_0 - M)}{C} \cdot \left(1 - \frac{\omega^2 C(L_0 + M)}{2}\right)} \quad (10)$$

The phase constant $\beta_I$ of this circuit becomes as follows in the range (pass band) of $A<1$:

$$\cos \beta_I = A = \frac{1 - \omega^2 C L_0}{1 - \omega^2 C M} \quad (11)$$

When the factor representing the degree of coupling between adjacent coils is taken as $k(=M/L_0)$ and the factor representing variation of capacitance is taken as $K(=C/C_0)$, the above formulae (10) and (11) can be respectively rewritten as follows:

$$Z_0 = R_0 \sqrt{\frac{1}{K} - \left(\frac{\omega}{\omega C_0}\right)^2} \quad (12)$$

$$\cos \beta_I = \frac{1 - \frac{2K}{1+k}\left(\frac{\omega}{\omega C_0}\right)}{1 - \frac{2K}{1+k} k \left(\frac{\omega}{\omega C_0}\right)} \text{ where} \quad (13)$$

$$R_0 = \frac{2L_0(1-k)}{C_0} \text{ and } \omega_{C_0} = \frac{2}{C_0 L_0(1+k)}.$$

Accordingly, the amount of group delay $d\beta_I/d\omega$ is expressed as follows:

$$\frac{d\beta_I}{d\omega} = \frac{1}{\omega C_0} \cdot \frac{d\beta_I}{dx} = \frac{1}{\omega C_0} \cdot \frac{2\sqrt{a(1-k)}}{(1-akx^2)\sqrt{2-a(1+k)x^2}} \quad (14)$$

If the above equation (14) becomes constant for the received signal frequency of the VHF band, the phase characteristic of the circuit shown in FIG. 4 becomes proportional to the received signal frequency.

If the equation (14) is differentiated again, the following equation is obtained.

$$\frac{d^2\beta_I}{d\omega^2} = \frac{1}{\omega C_0^2} \cdot \frac{d^2\beta_I}{dx} = \frac{1}{\omega C_0^2} \cdot \quad (15)$$

$$\frac{x\{5k+1-3a(1+k)x^2}{(1-akx)^2\{2-a(1+k)x^2\}^{\frac{3}{2}}} \text{ where } x = \frac{\omega}{\omega C_0} \text{ and}$$

$$a = \frac{2K}{1+k}$$

If the equation (15) is for the received signal frequency in the VHF band, it is sufficient. Accordingly, the following equation (16) is derived from the equation (15).

$$f(x,k) = B \ 5k + 1 - 3a(1+k)x^2 = 5k + 1 - 6Kx \quad (16)$$

The condition which makes the equation (16) zero is sufficient.

Figure 5:
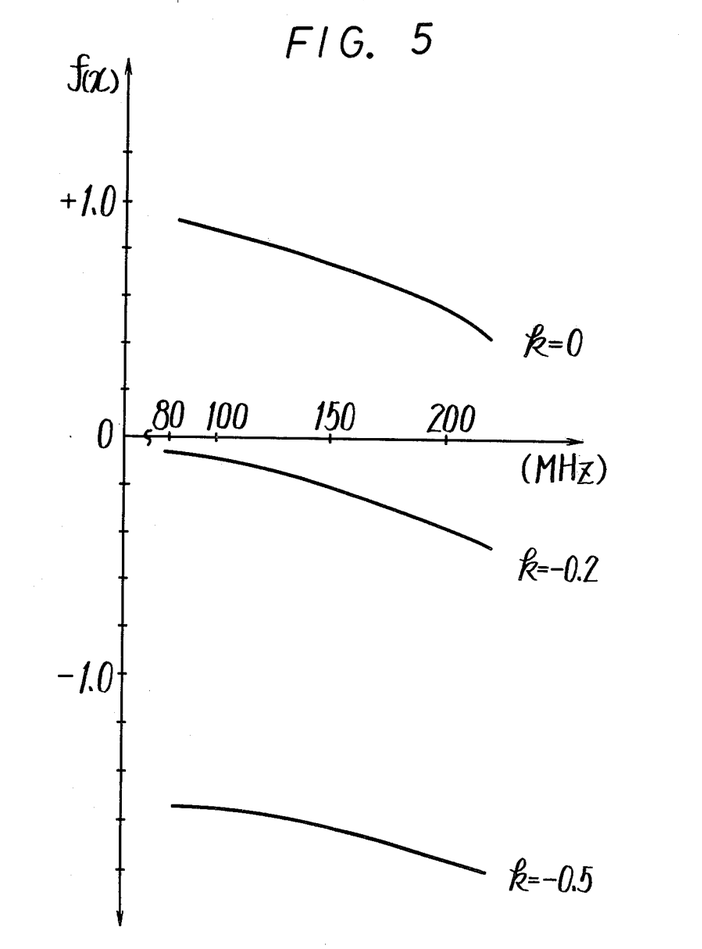
FIG. 5 and FIGS. 6A to 6C are respectively characteristic diagrams of the circuit shown in FIG. 3.

The variation of f(x, k), when K=1 and k is taken as a parameter, is shown in the graph of FIG. 5.

From the graph of FIG. 5 it will be apparent that if the degree of coupling k is selected as about (k=)−0.2, the amount of phase shift $\beta_I$ can be varied approximately linearly for the frequency.

Figure 6A:
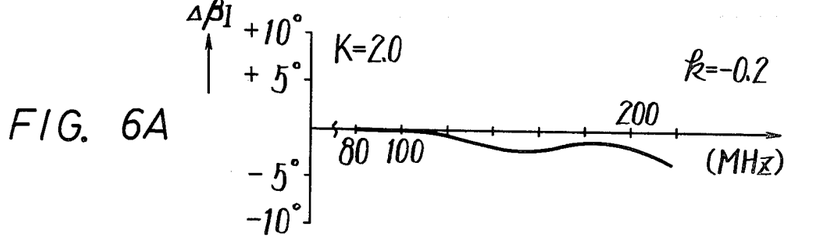
Figure 6B:
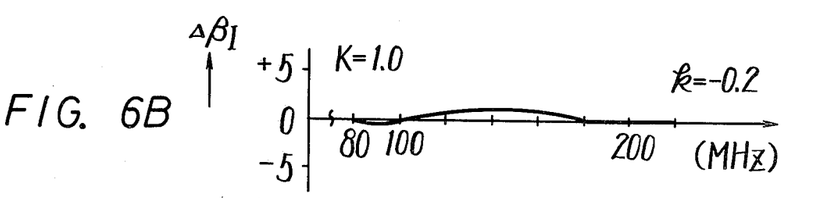
Figure 6C:
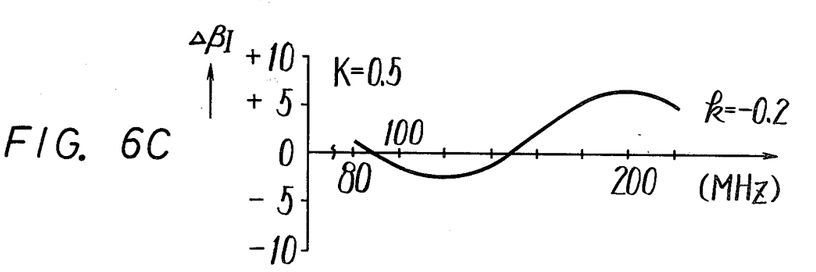

FIGS. 6A, 6B and 6C are graphs respectively showing the frequency to amount of phase shift $\beta_I$ characteristics when eight stages of L-C unit circuits, each being selected to have k=−0.2, are connected in cascade. In these graphs, a phase error $\Delta\beta_I$ is the deviation from the straight line (error from linearity) connecting the respective amounts of phase shift at the frequencies of 0 and 90 MHz, which is calculated.

As will be apparent from the graphs of FIGS. 6A to 6C, when it is selected that k=−0.2 the error from linearity will fall within ±5° in the range of $0.5 < K < 2.0$.

In the above analysis, it is assumed that the circuit of FIG. 4 is formed of a lossless transmission line. In fact, however, there is a loss caused by the deterioration in Q of the L-C circuit formed by the coil and the variable capacitance diode, and this loss poses a problem when a plurality of the circuits, such as shown in FIG. 4, are connected in cascade.

Therefore, a case where n-stages of the circuits shown in FIG. 4 are connected in cascade will be analized while the resistance R of its coils and the conductance G of its capacitors are taken into consideration. That is, since the phase characteristic is approximately linear as shown in the previous analysis, the circuit formed by connecting n-stages of the circuits of FIG. 4 in cascade may be considered equivalent to a distributed constant circuit. Accordingly, when a transmission signal is of high frequency, the propagation constant $r = (\alpha + j\beta)$ is given by the following equations (17) and (18).

$$\alpha \simeq \left( \frac{R}{2} \sqrt{\frac{C}{L}} + \frac{G}{2} \sqrt{\frac{L}{C}} \right) \left\{ 1 - \frac{1}{8} \left( \frac{R}{\omega L} - \frac{G}{\omega C} \right)^2 \right\} \quad (17)$$

$$\simeq \frac{R}{2} \sqrt{\frac{C}{L}} + \frac{G}{2} \sqrt{\frac{L}{C}}$$

$$\beta \simeq \omega LC \left\{ 1 + \frac{1}{8} \left( \frac{R}{\omega L} - \frac{G}{\omega C} \right) \right\} \quad (18)$$

$$= \omega \sqrt{LC}$$

where $\omega L >> R$ and $\omega C >> G$.

Figure 7:
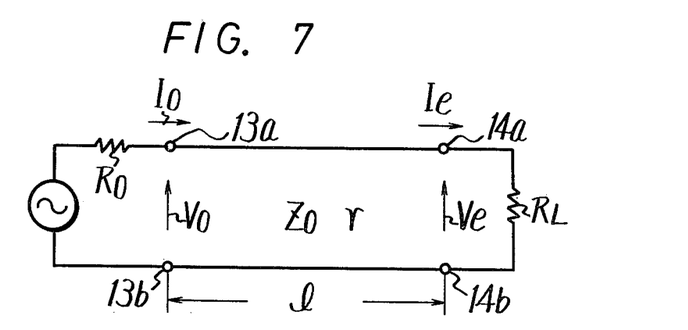
FIG. 7 is a circuit diagram used to explain the operation of the variable phase shifter used in the example of FIG. 3.

Thus, when the transmission line which has the characteristic impedance $Z_0$ and the propagation constant r as shown in FIG. 7 is considered, the relationship of voltage $V_0$ to, current $I_0$ between input terminals 13a and 13b to voltage $V_l$, to current $I_l$ between output terminals 14a and 14b becomes as follows:

$$\begin{pmatrix} V_0 \\ L_0 \end{pmatrix} = \begin{pmatrix} \cosh rl, & Z_0 \sinh rl \\ \frac{1}{Z_0} \sinh rl, & \cosh rl \end{pmatrix} \begin{pmatrix} V_l \\ I_l \end{pmatrix} \quad (19)$$

In this case, when the transmission line is terminated with the terminal resistance $R_L = R_0$, the actual transmission coefficient $S_B$ is given as follows:

$$S_B = \frac{1}{2} \left( A + \frac{B}{R_L} + R_L C + D \right) \quad (20)$$

From the above $S_B$, the actual amount of attenuation $\alpha_B$ is given as follows:

$$\alpha_B = 10 \log |S_B|^2 [\text{dB}] \quad (21)$$

While, the propagation constant $r_n$ when n-stages of the circuits are connected in cascade is given as follows:

$$r_n = n\alpha + jn\beta_I \quad (22)$$

The characteristic impedance $Z_0$ and the phase constant $\beta_I$ are given by the equations (12) and (13), respectively.

Accordingly, from the equations (19) and (20), the following equation (23) is derived.

$$|S_B|^2 = \left\{ \cosh n\alpha + \frac{1}{2} \left( \frac{Z_0}{R_L} + \frac{R_L}{Z_0} \right) \sinh n\alpha \right\}^2 \cos^2 n\beta_I \quad (23)$$

And, the actual phase $\beta_B$ becomes as follows:

$$\beta_B = \tan^{-1} \left[ \frac{\sinh n\alpha + \frac{1}{2} \left( \frac{Z_0}{R_L} + \frac{R_L}{Z_0} \right) \cosh n\alpha}{\cosh n\alpha + \frac{1}{2} \left( \frac{Z_0}{R_L} + \frac{R_L}{Z_0} \right) \sinh n\alpha} \right] \tan n\beta_I \quad (24)$$

Figure 8:
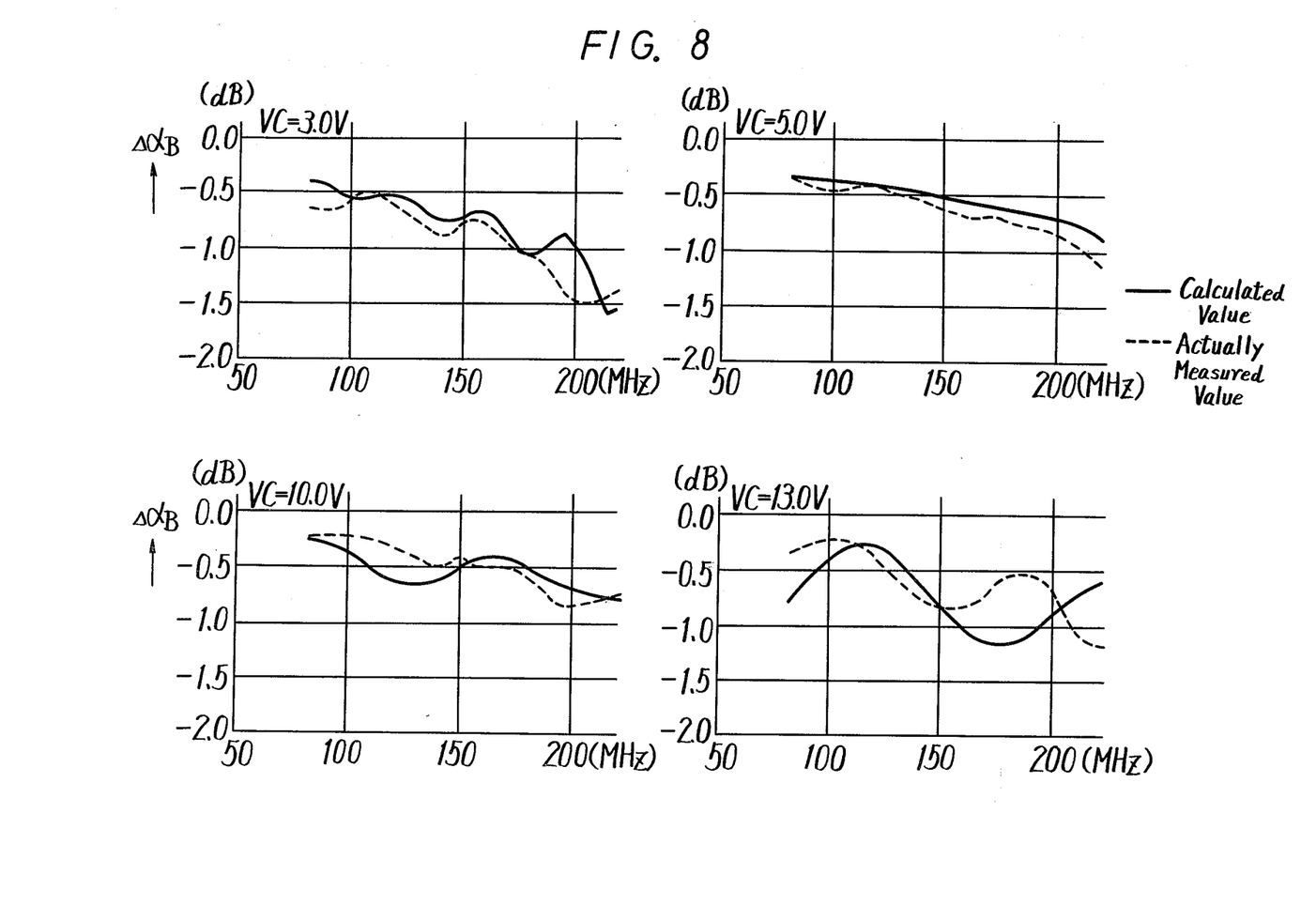
FIGS. 8 and 9 are respectively characteristic diagrams of the variable phase shifter used in the example of FIG. 3.
Figure 9:
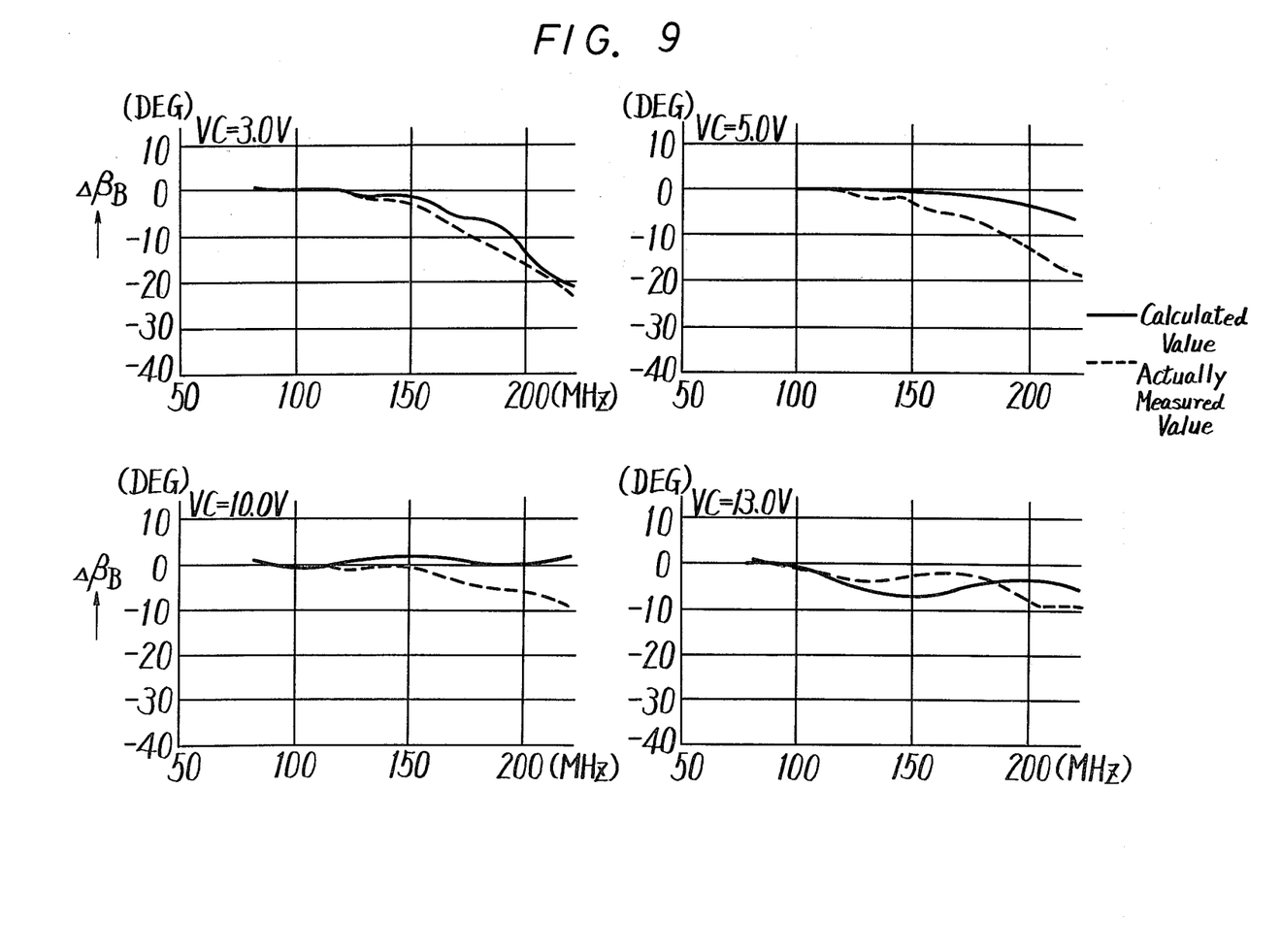
Figure 10:
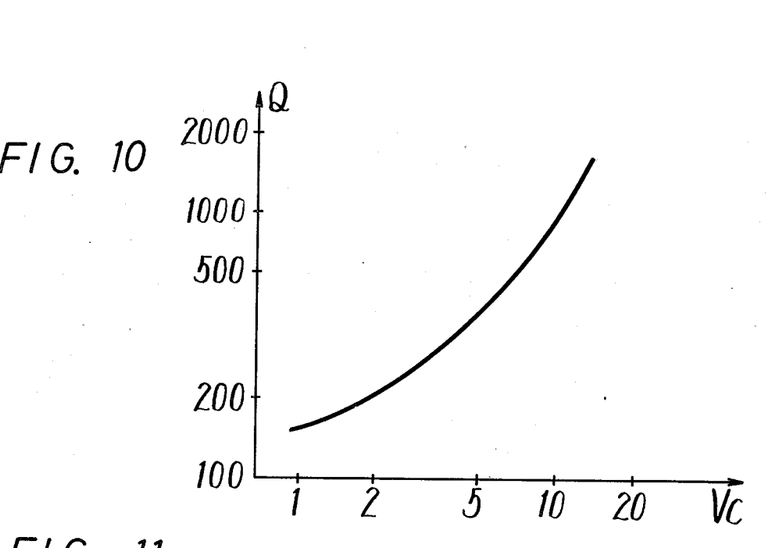
FIG. 10 is a characteristic diagram of the variable capacitance diode used in the example of FIG. 3.

From the above equations (21) and (24), when the degree of coupling k=−0.2 is selected and number of stages n=10, the inductance of the coil of each stage L=25.0 nH and that the voltage $V_c$ applied to the variable capacitance diode is taken as a parameter, the theoretical values of the frequency characteristic of errors $\Delta\alpha_B$ and $\Delta\beta_B$ from linearity of the actual attenuation degree $\alpha_B$ of the frequency characteristic and actual phase $\beta_B$ become as indicated by the solid lines in the graphs of FIGS. 8 and 9, respectively. Further, the converting characteristic curve of the applied voltage $V_c$ to Q value of the variable capacitance diode becomes as shown in the graph of FIG. 10.

As will be apparent from the above graphs, by selecting the degree of coupling k=−0.2, the errors $\Delta\alpha_B$ and $\Delta\beta_B$ from linearity of the actual degree of attenuation $\alpha$HD B and the amount of phase shift $\beta_B$ can be greatly reduced.

Figure 11:
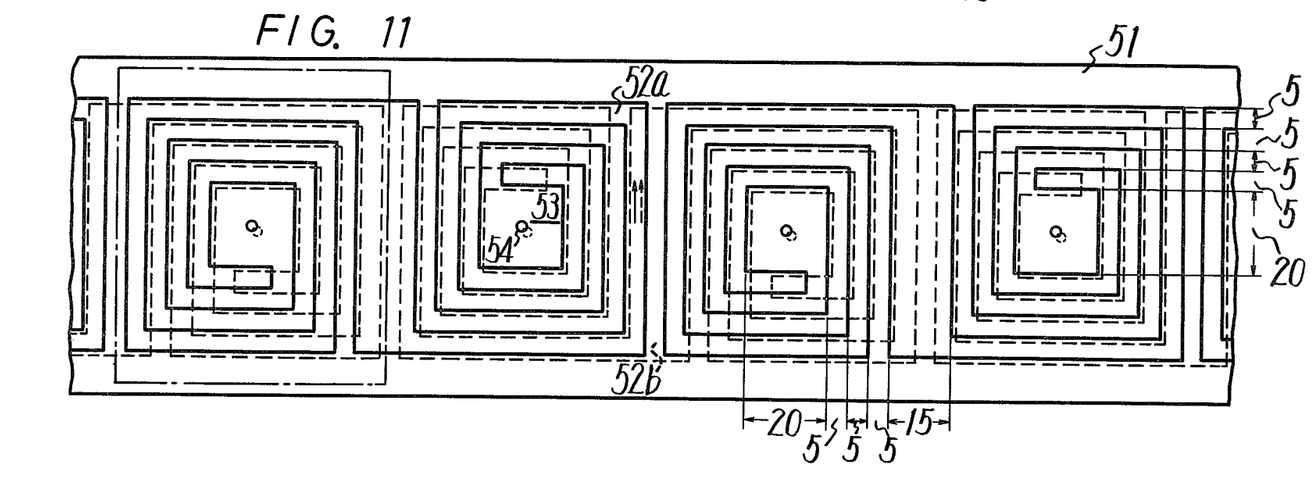
FIG. 11 is a top plan view showing an example of the variable phase shifter used in the example of FIG. 3.

Therefore, if, for example, as shown in FIG. 11 conductive line patterns are formed or coated on both surfaces of a circuit board having a predetermined thickness to locate respective coils in close proximity, the coil arrangement can be formed in which the degree of coupling k between adjacent certain coils is −0.2. In detail, as shown in FIG. 11, on both or front and rear surfaces of the circuit board 51, respectively are formed printed coils 52a and 52b each formed of, for example, a spiral form of metal foil. In FIG. 11, the solid line represents the printed coil 52a on the front surface of the circuit board 51 and the broken line represents coil 52b on the rear surface thereof, respectively. In this case, the coil 52b on the rear surface of the circuit board 51 is displaced from the coil 52a on the front surface in the directions both to the right and down by 1 mm and the unit of the numerals on the sheet is in millimeters.

At the center portion 53 of the spiral of each of the printed coils 52a and 52b, a bore 54 is formed through the circuit board 51, and the cathode lead of the variable capacitance diode 11 is inserted into the bore 54 and soldered to the printed coils 52a and 52b on the front surface and rear surface of the circuit board 51, respectively.

Thus, the circuit portion shown in FIG. 11 which is surrounded by the one-dot chain line is equal to the fundamental circuit shown in FIG. 4. In this case, through the printed coils 52a and 52b, currents respectively flow in the direction indicated by the solid and broken lines arrows, in other words, through the opposing portions of printed coils 52a and 52b the currents flow in the same direction, so that the coupling therebetween is negative. By selecting the size and shape of the printed coils 52a and 52b as indicated in FIG. 11, the inductance L of the coils can be set as, for example, 25.0 nH and the degree of coupling k between the coils can be set at $-0.2$.

Figure 12:
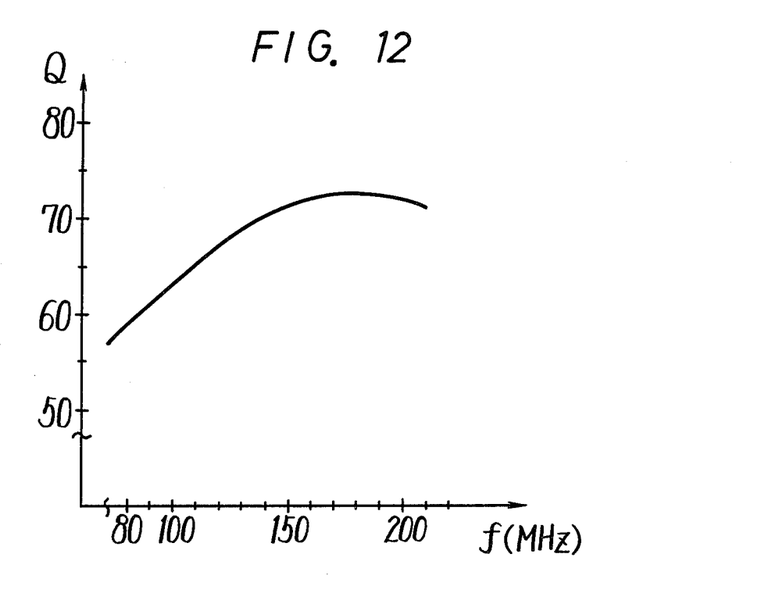
FIGS. 12 and 13 are respectively characteristic diagrams of the coils shown in FIG. 11.
Figure 13:
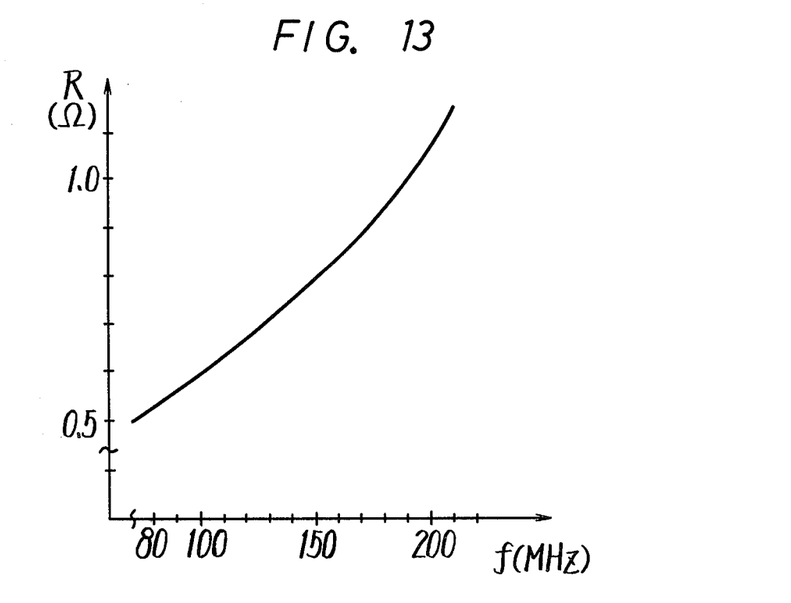

FIG. 12 is a graph showing the frequency characteristic of the printed coils 52a and 52b at Q values, and FIG. 13 is a graph showing the actually measured values of the frequency characteristic of the resistance values of the printed coils 52a and 52b, respectively.

When the circuit surrounded by the one-dot chain line in FIG. 11 is connected in cascade with 10 stages, the actual measured values of the frequency characteristics of errors $\Delta\alpha_B$ and $\Delta\beta_B$ from linearity of the frequency characteristic of the actual degree of attenuation $\alpha_B$ and actual amount of phase shift $\beta_B$ respectively become as shown in the graphs of FIGS. 8 and 9 by the broken lines which are approximately equal to the theoretical or calculated values.

Figure 14:
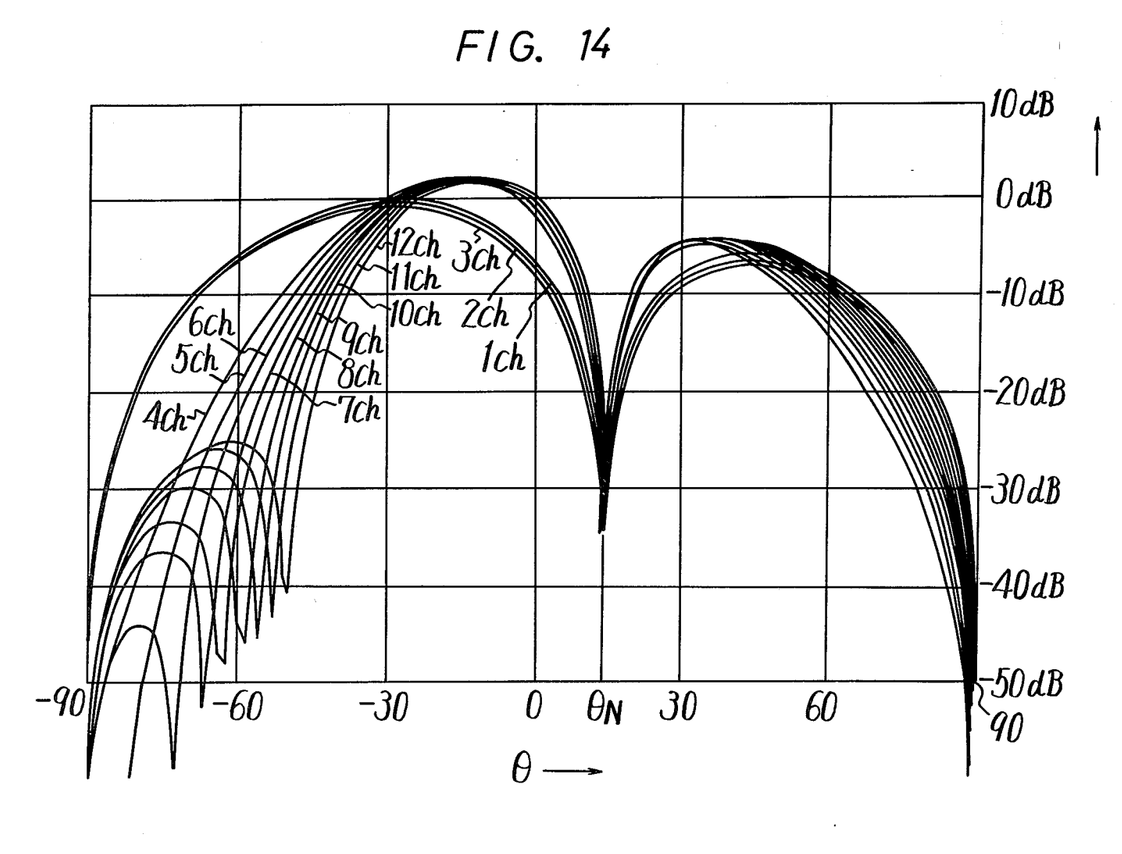
FIG. 14 is a directivity characteristic diagram of FIG. 3 when using the coil arrangement shown in FIG. 11.

FIG. 14 is a graph showing an example of the directional characteristics of an undesired signal canceller which uses the above coil device, in which $C_0 = 3p^F$. From this graph it will be apparent that the cancelling ratio of about $-30$ dB is obtained at the null point $\theta_N$.

The above example is the case where the undesired signal arrives from the right side relative to a desired signal, but in the case where the undesired signal arrives from the left side, by changing the switching circuit 7, the null direction can be formed at the left front.

As described above, if the degree of coupling between the adjacent coils in the circuit of FIG. 3 is selected as about $-0.2$, it is apparent that the null direction can be stabilized regardless of the received signal frequencies.

Figure 15:
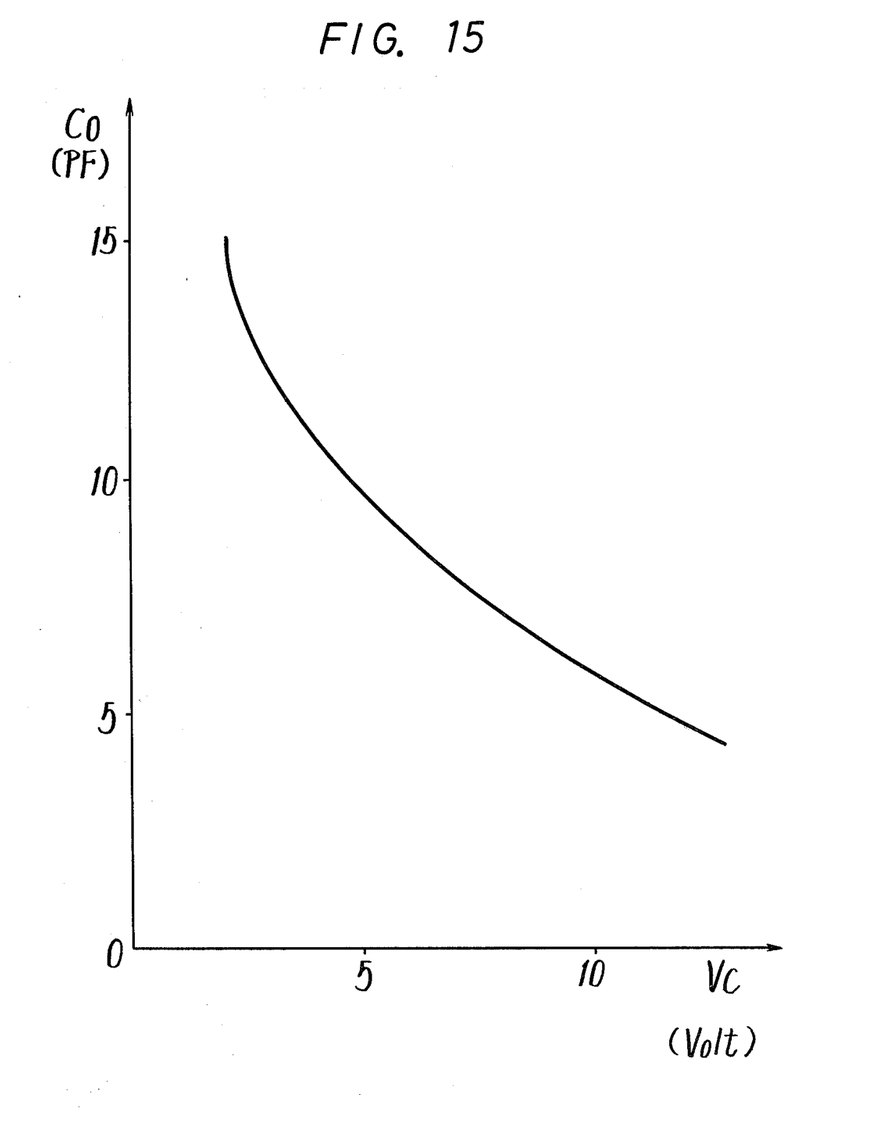
FIG. 15 is a characteristic diagram of the variable capacitance diode used in the example of FIG. 3.

In the circuit of FIG. 3, the control bias voltage ($V_c$) versus capacity ($C_0$) characteristic of the variable capacitance diode is now-linear as shown in the graph of FIG. 15. As a result, an electric field of, for example, more than 90 dB is applied thereto, and beat interference may be generated in the circuit of FIG. 3. That is, when the signals of, for example, the first and third channels are mixed, a beat interference may be caused in the eighth channel.

Figure 16:
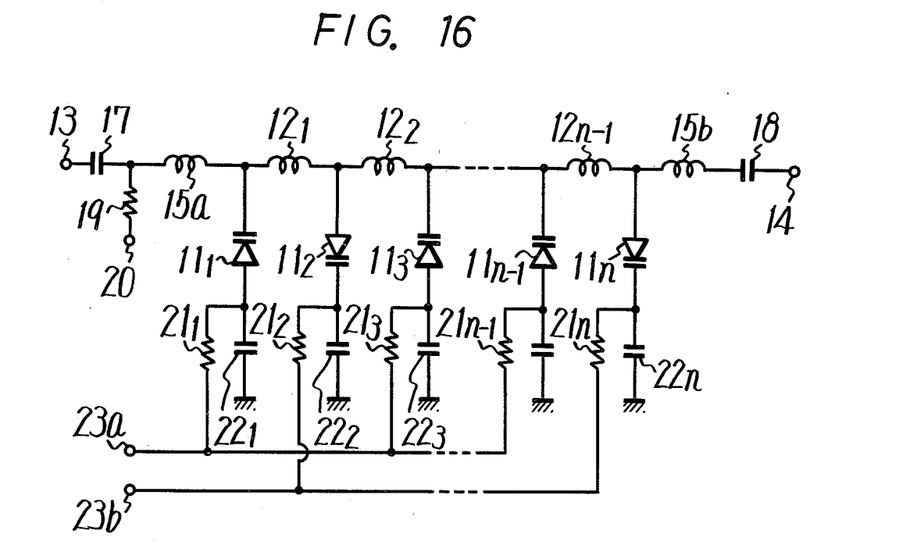
FIG. 16 is a circuit diagram showing an improved variable phase shifter useable in the invention.

An improved phase shifter according to the invention, which will avoid the generation of the above beat interference, is shown in FIG. 16, the circuit elements corresponding to those of the phase shifter of FIG. 2 or 3 are marked with the corresponding reference numerals and letters.

In the example of FIG. 16, capacitors 17 and 18 are respectively connected to the input and output terminals 13 and 14, and a fixed bias is applied through a resistor 19 to the input coil 15a from a terminal 20. Further, the polarities of diodes $11_1$ to $11_n$ are alternately made opposite, and the cold ends of the respective diodes are individually grounded through capacitors $22_1, 22_2 --- 22_n$. The connection points between the anodes of every other diodes $11_1, 11_3 --- 11_{n-1}$ and the capacitors $22_1, 22_3 --- 22_{n-1}$ are connected together through resistors $21_1, 21_3 --- 21_{n-1}$ to a bias terminal 23a, and the connection points between the cathodes of the diodes $11_2, --- 11_n$ and the capacitors $22_2 --- 22_n$ are connected together through resistors $21_2 --- 21_n$ to another bias terminal 23b.

In the circuit of FIG. 16, the bias voltage at the terminal 20 is fixed, and two control voltages, which vary oppositely with the fixed bias voltage as the center, are applied to the bias terminals 23a and 23b, respectively, so that the capacitance value $C_0$ of the diodes $11_1$ to $11_n$ is controlled in a manner similar to the example of FIG. 3, whereby a desired amount of phase shift $\phi$ is obtained.

The fact that the circuit of FIG. 16 greatly reduces the beat interference as compared with the circuit of FIG. 3 will be now explained in detail.

The capacitance ($C_0$) $-$ DC bias voltage ($V_c$) characteristic of the variable capacitance diodes is approximately expressed by the following equation (25).

$$C(V_c) = \frac{1}{a + b \cdot V_c + c \cdot V_c^2 + d \cdot V_c^3} (F) \quad (25)$$

where $2 \text{ V} \leq V_c \leq 13 \text{ V}$, $a = 3.6728 \times 10^{10}$, $b = 1.7034 \times 10^{10}$, $c = -1.1924 \times 10^9$ and $d = 8.0065 \times 10^7$.

Now, if it is assumed that when a signal $\Delta e$ is applied to a variable capacitance diode which is biased with a DC voltage $V_c$, its capacitance $C(V_c)$ changes by $\Delta C$ and, the following equation is established.

$$C = A_1 \Delta e + A_2 (\Delta e)^2 + A_3 (\Delta e)^3 + \cdots \quad (26)$$

where $$A_n = \frac{1}{n!} \cdot \frac{d^n}{dV^n} C(V_c)$$

Thus, since the relation of $\Delta e$ to $\Delta C$ becomes non-linear when, an input with a large amplitude is applied, higher harmonic components are generated.

Figure 17:
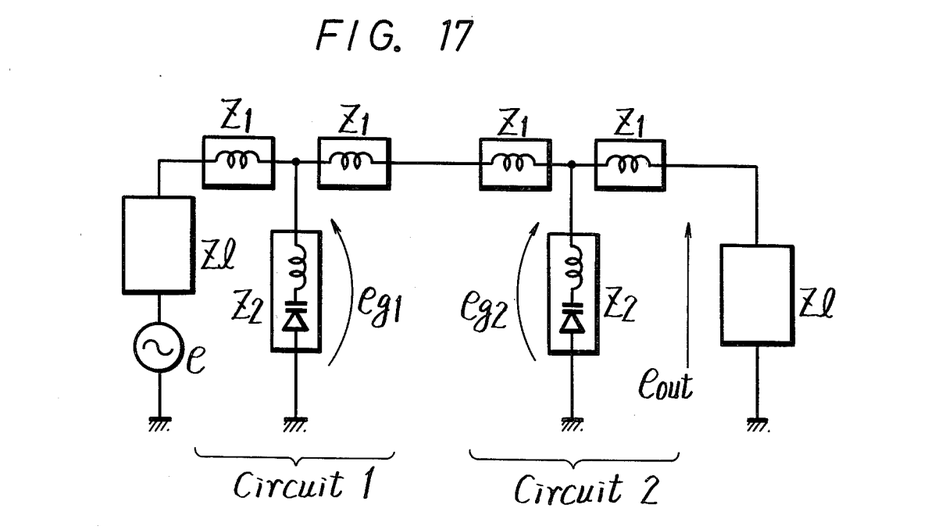
FIG. 17, FIGS. 18A to 18C and FIG. 19 are respectively circuit diagrams used to explain the improved point of the variable phase shifter shown in FIG. 16.

Now, consideration is given to the generation of how much harmonic distortion occurs when the above variable capacitance diode is applied to a phase shifter. Thus, such a circuit will be considered in which a fundamental unit circuit is connected in cascade with two stages as shown in FIG. 17. In this case, it is assumed that the load and the signal source resistances are each equal to the characteristic impedance $Z_l$ of the whole phase shifter. However, $$Z_1 = j\omega(L-M)$$

where
$M/L = -0.2$ and $$Z_2 = j\left(\omega L - \frac{1}{\omega C_0}\right)$$

where $Z_0$ is the characteristic impedance of the phase shifter and $C_0$ is the various capacitance by the DC bias value.

When the signal source of e is applied to the above phase shifter, voltages $e_{g1}$ and $e_{g2}$ applied across the variable capacitance diodes of the circuits 1 and 2 in the phase shifter of FIG. 17 are given by the following equations.

$$e_{g1} = \dot{K}_{107} e \tag{27}$$

$$e_{g2} = \dot{g}_{107} \dot{K}_{107} e \tag{28}$$

where $$\dot{K}_\omega = \frac{\dot{Z}_2(2\dot{Z}_1 + \dot{Z})}{(\dot{Z}_1 + \dot{Z}_l + \dot{Z}_2)(2\dot{Z}_1 + \dot{Z}) + \dot{Z}_2(\dot{Z}_1 + \dot{Z}_l)}$$

$$\dot{g}_\omega = \frac{\dot{Z}}{2\dot{Z}_1 + \dot{Z}}$$

$$\dot{Z} = \frac{\dot{Z}_2(\dot{Z}_1 + \dot{Z}_l)}{\dot{Z}_1 + \dot{Z}_l + \dot{Z}_2}$$

Figure 18A:
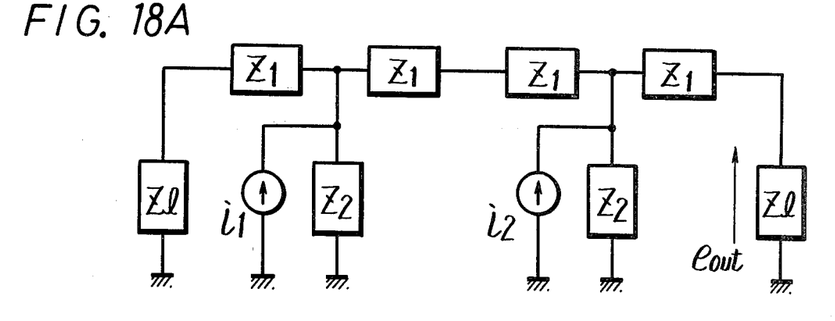

Under the assumption that when the voltages $e_{g1}$ and $e_{g2}$ are applied to the variable capacitance diiodes, harmonic distortion is generated, current sources for currents $i_1$ and $i_2$ which are shown in FIG. 18A and also given by the following equations will be considered:

$$i_1 = (C_0 + \Delta C)\frac{de_{g1}}{dt} + e_{g1}\frac{d\Delta C}{dt} \tag{29}$$

$$i_2 = (C_0 + \Delta C)\frac{de_{g2}}{dt} + e_{g2}\frac{d\Delta C}{dt} \tag{30}$$

Figure 18B:
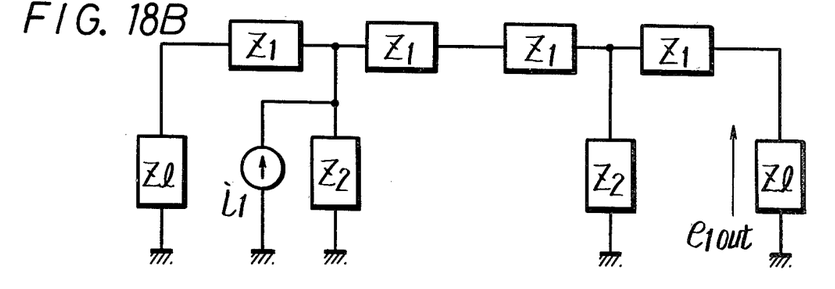
Figure 18C:
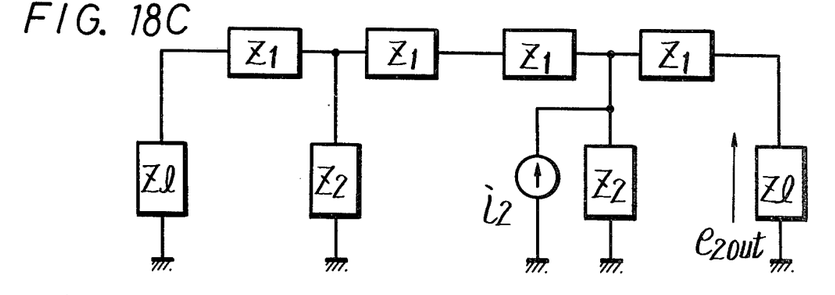

Further, since the amplitude of the harmonic components is small as compared with that of the fundamental wave component, it is considered that in the section other than that in question harmonic components are generated by only the fundamental wave component. The output $e_{out}$ of the circuit shown in FIG. 18A may be considered as follows. That is, the circuit of FIG. 18A is separated as shown in FIGS. 18B and 18C, and outputs $e_{1\,out}$ and $e_{2\,out}$ thereof are added to provide the output $e_{out}$. The outputs $e_{1\,out}$ and $e_{2\,out}$ are given by the following equations (31) and (32), respectively.

$$e_{1\,out} = R_\omega\left\{(C_0 + \Delta C)\frac{de_{g1}}{dt} + e_{g1}\frac{d\Delta C}{dt}\right\} \tag{31}$$

$$e_{2\,out} = r_\omega\left\{(C_0 + \Delta C)\frac{de_{g2}}{dt} + e_{g2}\frac{d\Delta C}{dt}\right\} \tag{32}$$

where $$R_\omega = \frac{Z_2 \cdot Z_l}{Z_1 + Z_2 + Z_l} \cdot \frac{Z_1 + Z_l}{3Z_1 + Z + Z_l}$$

-continued $$r_\omega = \frac{Z_l(2Z_1 + Z)}{3Z_1 + Z_l + Z}$$

Therefore, $$e_{out} = e_{1\,out} + e_{2\,out} \tag{33}$$

$$= (C_0 + \Delta C)\left(R_\omega \frac{de_{g1}}{dt} + r_\omega \frac{de_{g2}}{dt}\right) +$$

$$(R_\omega \cdot e_{g1} + r_\omega \cdot e_{g2})\frac{d\Delta C}{dt}$$

From the above discussion, it will be considered that two sine waves which are different in frequency are simultaneously applied to the above non-linear circuit i.e. the signal e expressed by the following equation (34) is applied to the non-linear circut.

$$e = E_1 \cos \omega_1 t + E_2 \cos \omega_2 t \tag{34}$$

If the above equation (34) is substituted into the equations (27) and (28), the voltages $e_{g1}$ and $e_{g2}$ across the variable capacitance diodes respectively become as follows:

$$e_{g1} = \dot{K}_{107\,1}E_1 \cos \omega_1 t + \dot{K}_{107\,2}E_2 \cos \omega_2 t \tag{35}$$

$$e_{g2} = \dot{g}_{107\,2}\dot{K}_{107\,1}E_1 \cos \omega_1 t + \dot{g}_{107\,2}\dot{K}_{107\,2}E_2 \cos \omega_2 t \tag{36}$$

If the above equations (35) and (36) are substituted into the equations (29) and (30), respectively, the current sources of $i_1$ and $i_2$ are obtained as follows:

$$i_1 \approx (C_0 + A_1 e_{g1} + A_2 e_{g1}^2)\frac{de_{g1}}{dt} + A_1 e_{g1}\frac{de_{g1}}{dt} + A_2 e_{g1}\frac{de_{g1}^2}{dt} \tag{37}$$

$$i_2 \approx (C_0 + A_1 e_{g2} + A_2 e_{g2}^2)\frac{de_{g2}}{dt} + A_1 e_{g2}\frac{de_{g2}}{dt} + A_2 e_{g2}\frac{de_{g2}^2}{dt} \tag{38}$$

The above equations are developed, and considerating only the components of $\omega_1 + \omega_2$, they are substituted into the equations (31) and (32), respectively. Then, the outputs $e_{1\,out}$ and $e_{2\,out}$ can be expressed as follows:

$$e_{1\,out} = \dot{R}_{107\,1}\dot{B}_{\omega 1}\sin_{107}1t + \dot{R}_{107\,1+\omega 2}\dot{B}_{107\,1+\omega 2}\sin(\omega 1 + \omega 2)t \tag{39}$$

$$e_{2\,out} = \dot{r}_{\omega 1}\dot{b}_{\omega 1}\sin \omega_1 t + \dot{r}_{\omega 1+\omega 2}\dot{b}_{\omega 1+\omega 2}\sin(\omega 1 + \omega 2)t \tag{40}$$

where $$\begin{aligned}
\dot{B}_{\omega 1} &= C_0 + \frac{3A_2(\dot{K}_{\omega 1} \cdot E_1)^2}{4} + \frac{3A_2(\dot{K}_{\omega 2} \cdot E_2)^2}{2} \\
\dot{B}_{\omega 1+\omega 2} &= A_1 K_{\omega 2} E_2\left(1 + \frac{\omega 2}{\omega 1}\right) \\
\dot{b}_{\omega 1} &= \dot{g}_{\omega 1}\left\{C_0 + \frac{3A_2(\dot{k}_{\omega 1} \cdot E_1)^2}{4} + \frac{3A_2(\dot{k}_{\omega 2} \cdot E_2)^2}{2}\right\} \\
\dot{b}_{\omega 1+\omega 2} &= A_1\dot{g}_{\omega 2}\dot{k}_{\omega 2}E_2\left(1 + \frac{\omega 2}{\omega 1}\right) \\
\dot{k}_{\omega 2} &= \dot{K}_\omega \cdot \dot{g}_\omega
\end{aligned} \tag{41}$$

Accordingly, the total output $e_{out}$ becomes as follows:

$$e_{out} = e_{1\ out} + e_{2\ out} \qquad (42)$$

$$= (\dot{R}_{\omega 1} \dot{B}_{\omega 1} + \dot{r}_{\omega 1} \dot{b}_{\omega 1}) \sin\omega 1 t + (\dot{R}_{\omega 1} + \omega 2 \cdot \dot{B}_{\omega 1} + \omega 2 +$$
$$\dot{r}_{\omega 1} + \omega 2 \cdot \dot{b}_{\omega 1} + \omega 2)\sin(\omega 1 + \omega 2)t$$

From the above, the intermodulation product IP is given as follows:

$$IP = 20 \log \frac{|\dot{R}_{\omega 1} + \omega 2 \cdot \dot{B}_{\omega 1} + \omega 2 + \dot{r}_{\omega 1} + \omega 2 \cdot \dot{b}_{\omega 1} + \omega 2|}{|\dot{R}_{\omega 1} \dot{B}_{\omega 1} + \dot{r}_{\omega 1} \dot{b}_{\omega 1}|} \qquad (43)$$

Next, a case will be considered in which the polarities of the variable capacitance diodes are alternately inverted.

When the polarity of the DC bias to the variable capacitance diode is reversed, $\Delta C$ is given from the equation (26) as follows:

$$\Delta C = A_1'\Delta e + A_2'(\Delta e)^2 + A_3'(\Delta e)^3 + \cdots \qquad (44)$$

where $$A'_n = \frac{1}{n!} \cdot \frac{d^n}{dV^n} C(-V_c)$$

and the dash shows the case where the polarity is inverted.

The relation between $A_n$ in the equation (26) and $A_n'$ in the equation (44) becomes as follows:

$$A_n = (-1)^n A_n' \qquad (45)$$

Figure 19:
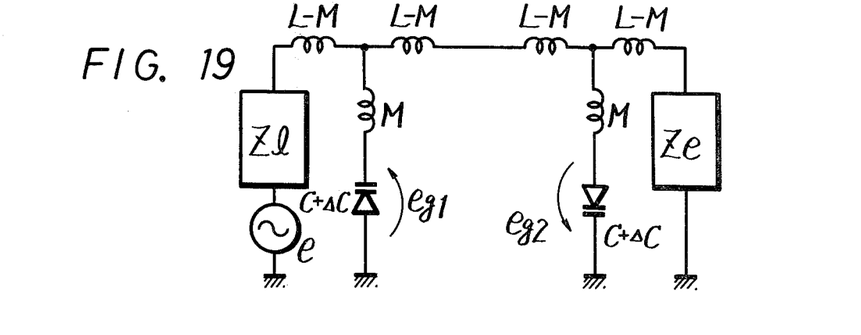

Accordingly, if the above relation is used, the intermodulation product can be similarly obtained even in the case where the polarity of the DC bias is alternately inverted. That is, when as shown in FIG. 19 the polarity of the rear stage of the variable capacitance diode in the fundamental 2 stages is inverted, the following relation is established from the equation (45).

$$\left.\begin{array}{l} A_1 = A'_1 \\ A_2 = A'_2 \end{array}\right\} \qquad (46)$$

So, from the equation (41), the following equation is established.

$$\dot{b}_{\omega 1} = \dot{b}'_{\omega 1} \qquad (47)$$
$$\dot{b}_{\omega 1} + \omega 2 = -\dot{b}_{\omega 1} + \omega 2$$

As a result, the intermodulation products IP' when the polarity of the DC bias is inverted can be expressed as follows:

$$IP' = 20 \log \frac{|\dot{R}'_{\omega 1} + \omega 2 \dot{B}'_{\omega 1} + \omega 2 + \dot{r}'_{\omega 1} + \omega 2 \dot{b}'_{\omega 1} + \omega 2|}{|\dot{R}'_{\omega 1} \dot{B}'_{\omega 1} + \dot{r}'_{\omega 1} + \dot{b}'_{\omega 1}|} \qquad (48)$$

$$= 20 \log \frac{|\dot{R}_{\omega 1} + \omega 2 \dot{B}_{\omega 1} + \omega 2 - \dot{r}_{\omega 1} + \omega 2 \dot{b}_{\omega 1} + \omega 2|}{|\dot{R}_{\omega 1} \dot{B}_{\omega 1} + \dot{r}_{\omega 1} \dot{b}_{\omega 1}|}$$

From the above theoretical analysis, the intermodulation products in the case that the polarities of the DC biases to the variable capacitance diodes are not inverted but selected to be the same (refer to the equation (43)) and the intermodulation products in the case where the polarities are alternately inverted (refer to the equation (48)) are respectively obtained.

When the equations (43) and (48) are compared, it is understood that in the case where the polarities of the DC biases to the variable capacitance diodes are inverted as in FIG. 19, the factors of $\omega 1$ (denominator) is the form of the sum and the same as that of the former case but the factor of $\omega 1 + \omega 2$ (numerator) is expressed in the form of subtraction which is different from the former case. Therefore, if the following relation is established, the value of intermodulation products can be made zero.

$$\dot{R}_{\omega 1} + \omega 2 \dot{B}_{\omega 1} + \omega 2 = \dot{r}_{\omega 1} + \omega 2 \dot{b}_{\omega 1} + \omega 2$$

Now, a case where the bias value ratio to the variable capacitance diode is worst is assumed, and then a practical value is applied for comparison.

That is, under the condition that $f_1 = 91.25$ MHz, $f_2 = 103.25$ MHz, $E_1 = E_2 = 45 \times 10^{-3}$ V(90 dB$\mu$), $L = 25_n$H, $M = 5_n$H and $V_c = +3$ V($C_0 = 12.6_p$F), if it is calculated how much the intermodulation product is improved, the following results are obtained.

1. When the polarities of the DC biases are all selected in the same direction, the intermodulation product IP is given from the equation (43) as follows:

$$IP = -45.02 \text{ dB}$$

2. When the polarities of the DC biases are varied alternately, the intermodulation product PI' is given from the equation (48) as follows:

$$IP' = -65.08 \text{ dB}$$

From the above, the degree of improvement of the intermodulation product becomes as follows: Degree of improvement of intermodulation product = $-20.06$ dB Now, a case where the L-C fundamental circuits of 10 stages are connected in cascade will be considered. At first, the intermodulation product $IP_n$ in the case where the L-C fundamental circuits of n stages are connected in cascade is approximately expressed as follows:

$$IP_n = 20 \log \{(1 + \text{intermodulation product of 1 stage})^n - 1\}$$

Since the value is obtained under the assumption that 2 stages are one set, when the intermodulation product is calculated as $n = 5$, the following results are obtained.

1. When the polarities of the DC biases are all selected in the same direction, the intermodulation product IP becomes as follows:

$$IP = -30.96 \text{ dB}$$

2. When the polarities of the DC biases are varied alternately, the intermodulation product IP' becomes as follows:

$$IP' = -51.09 \text{ dB}$$

In general, if the intermodulation product is selected higher than $-50$ dB, no problem appears on a picture screen. Therefore, it will be understood that the phase shifter of the invention shown in FIG. 16 is sufficient for avoiding the harmonic distortion.

Further, the merits of the circuit shown in FIG. 16 have been expedimentally proven.

As described above, according to this invention, the coupling degree k between the coils forming the variable phase shifter is selected to be about or around −0.2, so that errors from linearity of the insertion loss and the phase shift can be reduced and hence a good characteristic is obtained.

Further, in this invention when the respective coils of the variable phase shifter are made of printed coils, the coupling degree between the coils can be easily determined from the design thereof. Thus, the products can be made to have uniform characteristics and need not be adjusted.

Further, in the invention when the shapes of the printed coils are selected to be synmetrical with respect to the front and rear sides, there is not generated any ununiform portions in the characteristic and the characteristics are improved.

Also, in this invention when $C_0$ is provided by the variable capacitance diode and can be varied by superimposing a DC voltage on the signal path, a user can change the null point while he stays near a television receiver. Thus, the adjustment becomes easy. At this time, since only one signal line is sufficient, the wiring and so on are simple.

Although the present invention has been particularly shown and described with reference to certain preferred embodiments thereof, it will be readily apparent to those of ordinary skill in the art that various changes and modifications in form and details may be made without departing from the spirit and scope of the invention. Therefore, the spirits or scope of the invention should be determined by the appended claims.

We claim as our invention:

1. An undesired signal canceller for a radient energy receiver comprising first and second antennas spaced a distance (d) apart, a phase compensation circuit connected to said first antenna, a variable phase shift circuit connected to said second antenna, said variable phase shift circuit comprising a plurality of series connected inductors wherein adjacent ones of said inductors are magnetically coupled together and a plurality of voltage variable capacitors with adjacent ones of said plurality of voltage variable capacitors connected between ground and the junction points between adjacent ones of said series connected inductors, adding means connected to the outputs of said phase compensation circuit and said variable phase shift circuit and means for supplying a variable D.C. voltage to said voltage variable capacitors to control their capacitance.

2. An undesired signal canceller according to claim 1, wherein said degree of coupling is designed to be around −0.2.

3. An undesired signal canceller according to claim 2, wherein each of said inductors is formed on a circuit board as a printed coil.

4. An undesired signal canceller according to claim 3, wherein adjacent ones of said inductors are formed on both sides of said circuit board such that the degree of coupling can be easily designed to the desired value.

5. An undesired signal canceller according to claim 1, wherein each of said variable capacitors is formed as a variable capacitance diode, with the capacitance value thereof being variable by a variable DC voltage applied thereto.

6. An undesired signal canceller according to claim 5, wherein said variable DC voltage is applied to each of said variable capacitance diodes from the output side of said adding circuit.

7. An undesired signal canceller according to claim 1, wherein said phase compensation circuit comprises a low pass filter network.

8. An undesired signal canceller according to claim 1 wherein said means for supplying a D.C. voltage includes a choke coil connected in circuit with said voltage variable capacitors.

9. An undesired signal canceller according to claim 8 wherein said plurality of series connected inductors are formed as printed circuits.

10. An undesired signal canceller for a radient energy receiver comprising first and second antennas spaced a distance (d) apart, a phase compensation circuit connected to said first antenna, a variable phase shift circuit connected to said second antenna, said variable phase shift circuit comprising a plurality of series connected inductors and a plurality of voltage variable capacitors with adjacent ones of said plurality of voltage variable capacitors connected between ground and the junction points between adjacent ones of said series connected inductors, adding means connected to the outputs of said phase compensation circuit and said variable phase shift circuit and means for supplying a variable D.C. voltage to said voltage variable capacitors to control their capacitance, including first and second capacitors connected at the input and output respectively of said plurality of series connected inductors, a plurality of capacitors with one connected in series between ground and each of said voltage variable capacitors, adjacent ones of said voltage variable capacitors poled to pass current in opposite directions, a first fixed bias means connected to said series connected inductors, a first variable bias means connected to the first, third and odd alternate ones of said voltage variable capacitors and a second variable bias means connected to the second, fourth and even alternate ones of said voltage variable capacitors.

* * * * *